United States Patent [19]

Menges

[11] 4,423,891

[45] Jan. 3, 1984

[54] CORRUGATED HOSE COUPLING

[76] Inventor: William H. Menges, 149 Squan Beach Dr., Mantaloking, N.J. 08738

[21] Appl. No.: 306,214

[22] Filed: Sep. 28, 1981

[51] Int. Cl.³ .............................................. F16L 37/08
[52] U.S. Cl. .................................... 285/305; 285/331; 285/DIG. 4
[58] Field of Search ................. 285/305, 347, DIG. 4, 285/345, 276, DIG. 22

[56] References Cited

U.S. PATENT DOCUMENTS

| | | |
|---|---|---|
| 1,242,568 | 10/1917 | Loughridge . |
| 2,438,472 | 3/1948 | Calcott . |
| 2,441,344 | 5/1948 | Bosworth ...................... 285/347 X |
| 2,521,127 | 9/1950 | Price ............................. 285/347 X |
| 2,535,016 | 12/1950 | Launder . |
| 3,314,696 | 4/1967 | Ferguson et al. .............. 285/305 X |
| 3,565,464 | 2/1971 | Wolf ............................. 285/DIG. 4 |
| 3,625,551 | 12/1971 | Branton ............................... 285/347 |
| 3,667,785 | 6/1972 | Kapeker . |
| 3,929,356 | 12/1975 | De Vincent et al. . |
| 4,046,451 | 9/1977 | Juds et al. . |
| 4,141,576 | 2/1979 | Lupke ........................... 285/DIG. 4 |
| 4,368,904 | 1/1983 | Lanz ............................... 285/305 X |

Primary Examiner—Dave W. Arola
Attorney, Agent, or Firm—Richard C. Woodbridge

[57] ABSTRACT

A random length of corrugated hose forms part of a male/female coupling. According to the preferred embodiment the male connector is formed around the corrugated hose itself. One or more O-rings are seated in the exterior grooves closest to the end of the hose to be sealed. A split lock ring is then placed in one of the grooves behind the O-ring seals. The combination comprises the male portion of the invention which is received in a cavity in the female connector. A spring-loaded retaining clip is carried by a pair of parallel grooves in the female connector and adapted to close behind the split lock ring thereby preventing the female connector from disengaging from the corrugated hose. According to an alternative embodiment the O-ring seal may be placed inside the corrugated hose, thereby making the corrugated hose the female portion of the coupling which is adapted to receive a complimentary male connector.

6 Claims, 6 Drawing Figures

CORRUGATED HOSE COUPLING

BACKGROUND OF THE INVENTION

1. Field of the Invention

This invention relates to a coupling specifically for use with corrugated hose.

2. Description of the Prior Art

There are a wide variety of couplings known to those of ordinary skill in the art. However, there do not appear to be any prior art references directly similar to applicant's invention.

Of possible relevance is Juds et al, U.S. Pat. No. 4,046,451 which discloses the use of a clamping member which helps to lock a piece of corrugated cable into a female body member. A resilient O-ring sits in one of the valleys of the corrugated cable and presumably helps to form a seal therewith.

Launder, U.S. Pat. No. 2,535,016 discloses an interesting holding means which passes through the slots in the side of the female member and engages the grooves in an interior male member. An O-ring is shown located on the male member.

Other references of possible interest are: U.S. Pat. No. 1,242,568; U.S. Pat. No. 2,438,472; U.S. Pat. No. 3,667,785 and U.S. Pat. No. 3,929,356.

SUMMARY OF THE INVENTION

Briefly described the invention comprises a simple and inexpensive coupling for use with a random length of corrugated hose. According to the preferred embodiment one or more O-ring seals are seated in the circular grooves of the hose closest to the opening to be coupled. A split lock nut is then seated in one of the grooves directly behind the O-ring seals. The corrugated hose is then inserted into a receiving cavity in a female connector. The coupling is kept in place by a wire retaining clip carried by the female connector. The retaining clip is held in position by two parallel grooves which pass all the way through the side wall of the female connector. The parallel grooves are located behind the split lock ring when the male hose member is fully inserted into the female connector. Therefore, when the retaining clip is in place portions of it are located directly aft of the split lock ring. In this manner the retaining clip prevents the female connector from disengaging from the male hose member.

According to an alternative embodiment of the invention the O-ring seal may be placed in ine of the interior grooves of the corrugated hose and the coupling includes a male portion which is received inside the hose. In that manner the male/female roles of the hose and its connector are reversed from the teaching of the preferred embodiment.

These and other features of the invention will be more fully understood with reference to the following drawings.

DETAILED DESCRIPTION OF THE INVENTION

During the course of this description like numbers will be used to identify like elements according to the different figures which disclose the invention.

Figure 1:
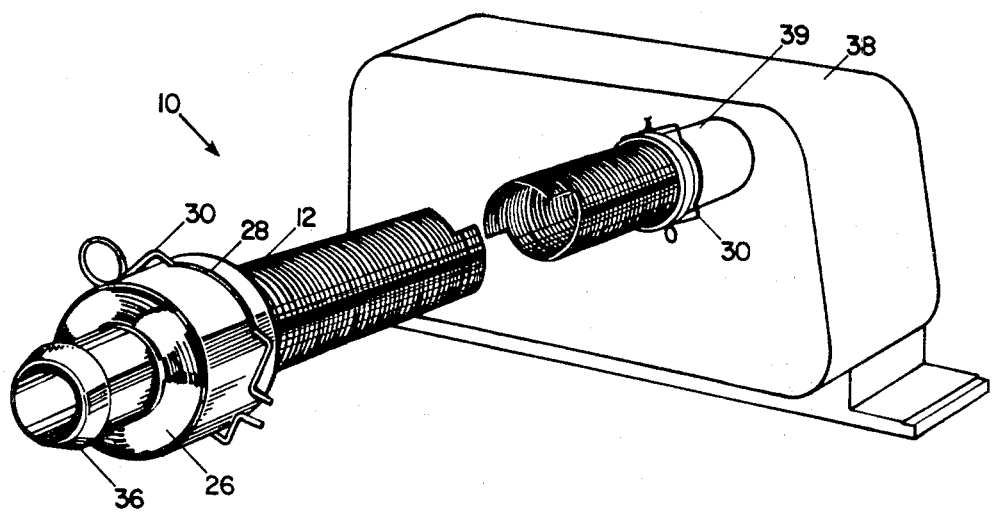
FIG. 1 is a perspective view of the coupling invention according to the preferred embodiment thereof.
Figure 2:
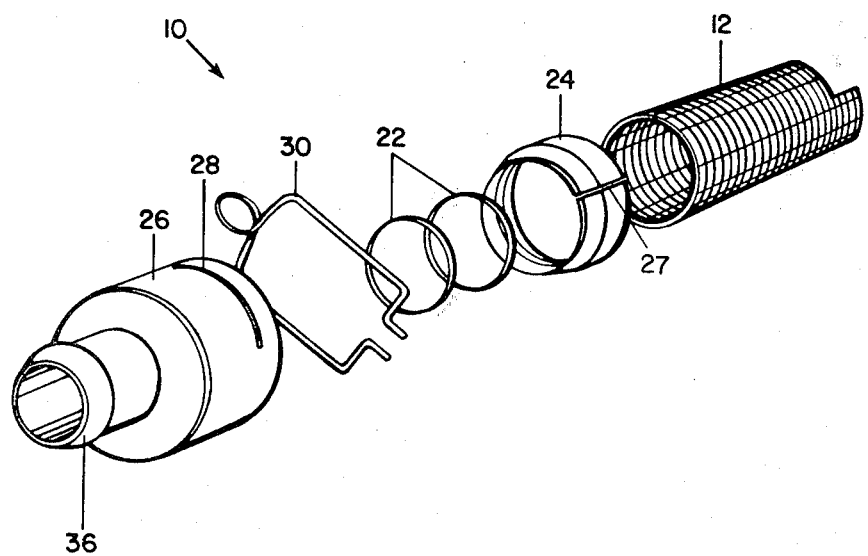
FIG. 2 is an exploded perspective view of the embodiment of FIG. 1 illustrating the relationship of the different elements that form the invention.

The invention 10 according to the preferred embodiment thereof is illustrated in FIGS. 1 through 5. FIG. 2 illustrates the basic elements of the invention 10 which essentially comprise a random length of corrugated hose 12, a split lock ring 24, one or more O-ring seals 22, a wire retainer clip 30 and a female coupling 26 adapted to receive corrugated hose 12.

Figure 3A:
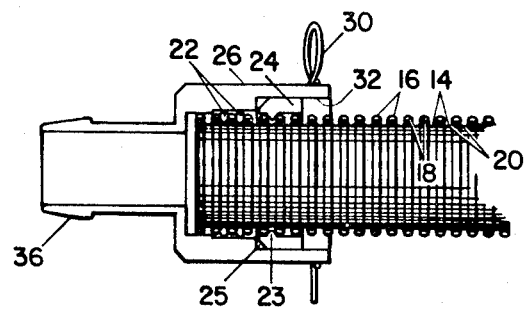
FIG. 3A is a side cross-sectional elevational view of the embodiment of FIG. 1.

Corrugated hose 12 includes a series of alternating grooves 14 and ridges 16 on its exterior as shown in FIG. 3A. The interior 34 of hose 12 similarly includes alternating grooves 18 and ridges 20. The structure of the hose 12 is such that an exterior groove 14 corresponds to an interior ridge 20 and an exterior ridge 16 corresponds to an interior groove 18. Grooves 14 and 18 and ridges 16 and 20 are circular (i.e. not spiral) and continuous. The dimensions of an exterior groove 14 are such that it can accomodate an O-ring 22 in such a way as to form an effective seal between the hose 12 and the interior female coupling cavity 32 as illustrated in FIG. 3A. Similarly, interior grooves 18 are dimensioned in such a way that they can accomodate an interior O-ring 44 so as to form a seal between the male member 43 and hose 12 as illustrated in the alternative embodiment 40 shown in FIG. 5. The general structure of hose 12 is conventional and known to those of ordinary skill in the art. It is preferably formed from a suitable plastic material such as polyvinylchloride polyethylene, neoprene, etc. While the general structure of hose 12 is known, it is important that its dimensions be sufficient to sealingly engage O-rings 22 or 44 while at the same time be receivable in coupling member 26 or 42.

Figure 3B:
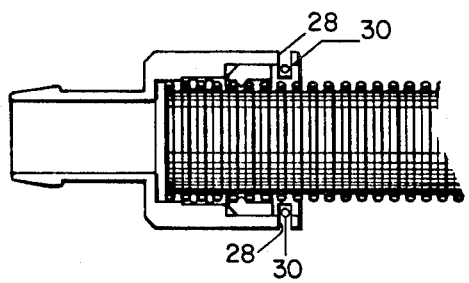
FIG. 3B is a horizontal cross-sectional view of the embodiment of FIG. 1.

O-ring 22 is a conventional O-ring made from conventional O-ring material such as neoprene or Viton ®. Similarly, interior O-ring 44 is formed of conventional materials but may be smaller in dimension than O-ring 22 due to the fact that O-ring 44 must seat in an interior groove 18 of hose 12 rather than in an exterior groove 14. Even though the structures of O-rings 22 and 44 are generally conventional it will be appreciated that their dimensional relationship to hose 12 and couplings 26 and 42 is important so that an effective seal is formed. According to the preferred embodiment only one exterior O-ring 22 or one interior O-ring 44 would be required. However, in order to improve the seal, more than one O-ring 22 or 44 might be employed. FIGS. 2 and 3A and 3B illustrate the use of two O-rings 22 even though one O-ring or three or more O-rings might be required by the specific environment in which the invention 10 is employed. Accordingly, the number of O-rings is not believed to be critical to the basic inventive concept disclosed herein.

Split lock ring 24 is located directly behind or aft of O-rings 22 and cooperates with retainer clip 30 to keep the hose 12 from backing out of female coupling 26. A split 27 in lock ring 24 allows the ring 24 to be expanded and the hose 12 to be inserted through it. When the lock ring 24 is allowed to relax its interior rim 23 engages one of the exterior grooves 14 behind O-rings 22. Split lock ring 24 includes a beveled leading edge 25 which guides it into the interior cavity 32 of the female coupling 26. The dimensions of interior cavity 32 are such that the lock ring 24 can't expand and therefore interior ring 24 is kept in permanent engagement with one of the exterior grooves 14. Split lock ring 24 is preferably formed from a nylon plastic material, but could be made from other suitable substances known to those of ordinary skill in the art.

Figure 4:
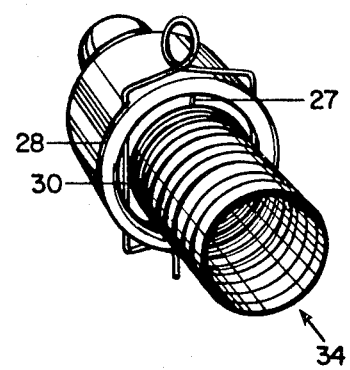
FIG. 4 is an end perspective view of the embodiment of FIG. 1 showing the relationship between the split lock ring and the wire retaining clip.

Female coupling 26 includes a pair of parallel body slots 28 located on opposite sides of its sidewalls. The slots 28 extend all the way through the sidewall skirt and into the interior cavity 32 of the female coupling 26. This structure allows the long portions or legs of the retainer clip 30 to be received in slots 28 in such a way that at least a portion of the retainer clip 30 is located directly behind the split lock ring 24 when the invention 10 is assembled as shown in FIG. 4. The presence of the retainer clip 30 behind the split lock ring 24 keeps the split lock ring 24 from backing out of interior cavity 32 thereby effectively locking the hose 12 with respect to the female coupling 26.

Retainer clip 30 is preferably made from a continuous piece of springy wire material so that in its relaxed state it does not back out of slots 28. The two free ends of retainer clip 30 may be twisted around each other in such a way as to close the loop formed by the wire and thereby guarantee that the retainer clip 30 never separates from female coupling 26. Alternatively, the clip 30 may be left in the manner illustrated in FIGS. 1 through 4 because the residual springiness of the wire material should be sufficient to keep the clip 30 in place.

The female coupling 26 also includes a standardized male protrusion 36 which may be inserted into a hose of a different diameter or into a conventional receptacle. The exact nature of male 36 is not critical to an understanding of the basic invention. For example, the same general inventive technique and structure may be used to couple a corrugated hose 12 to other types of items. Note in FIG. 1 that the end of hose 12 furtherest removed from female coupling 26 is shown connected to a tank 38. The exact dimension and structure of tank 38 is not critical. The one illustrated in FIG. 1 could, for example, be a power steering reservoir, a windshield washing solvent reservoir, a chemical or water container for industrial purposes, or any other type of vessel to which a quick and tight hose connection is desirable. The structure of the coupling between hose 12 and the tank 38 is identical to the structure illustrated in FIGS. 3A and 3B except that the female coupling 26 is integrated into the lead-in line 39 thereby doing away with the male protrusion 36. Retainer clip 30 keeps the hose 12 locked into lead-in line 39 in the same manner as previously described with respect to female coupling 26.

The coupling invention 10 according to the preferred embodiment illustrated in FIGS. 1 through 4 is assembled in the following manner. Firstly, the hose 12 is cut to the desired length. As far as the invention 10 is concerned the length of the hose 11 is immaterial and can be of any random length. It is desirable, though not absolutely necessary, that the coupled end of the hose 12 be cut flush in a plane approximately perpendicular to the length of the hose. However, some roughness in the cut is acceptable depending upon the exact dimensions of the interior cavity 32 of the female coupling 26. Secondly, split lock ring 24 is expanded so that the gap 27 enlarges to allow the hose 12 to be inserted through the lock ring 24. The lock ring 24 is then allowed to relax so that the interior rim 23 of the lock ring 24 engages one of the exterior grooves 14. Thirdly, one or two (or perhaps more as the environment requires) O-rings 22 are stretched and placed in one or more of the grooves 14 between the lock ring 24 and the end of the hose 14. Fourthly, the retainer clip 30 is placed on the female coupling 26 so that both legs of the retainer clip 30 are located within the interior cavity 32 of the coupling 26. Fifthly, and finally, the end of the hose 12 bearing O-rings 22 and split lock ring 24 is pushed into cavity 32 as far as it will go. The beveled leading edge 25 of the split lock ring 24 tends to push or cam the legs of the clip 30 sideways as the hose 12 passes into the cavity 32. Once the split lock ring 24 passes beyond the clip 30 the legs of the clip 30 naturally tend to snap into position behind the lock rings 24 thereby preventing the hose 12 from backing out of the cavity 32. In this manner the coupling 10 is formed in a quick and secure fashion.

Figure 5:
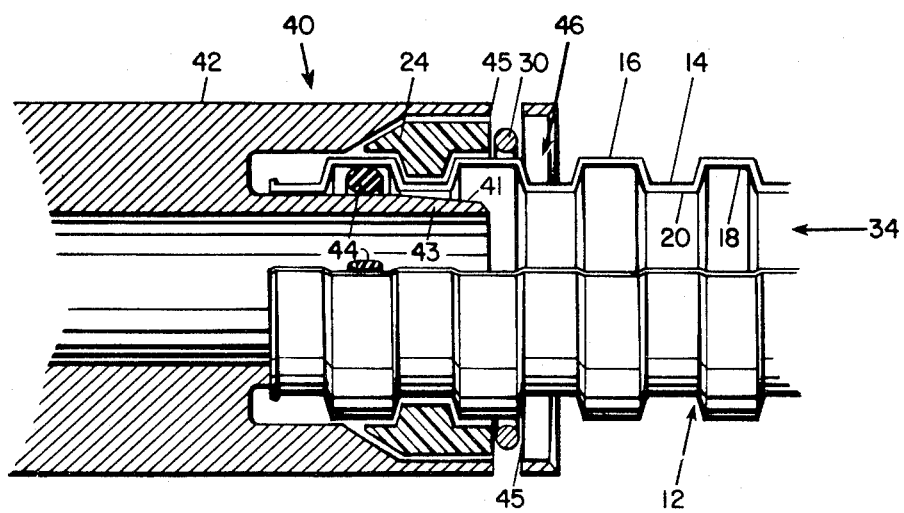
FIG. 5 is a partial cross-sectional view of an alternative embodiment of the invention in which the corrugated hose comprises the female section of the coupling.

An alternative embodiment 40 of the invention is illustrated in partial cross-sectional detail in FIG. 5. In structure and concept the alternative embodiment 40 is the reverse of the structure and concept of the preferred embodiment of the invention 10 illustrated in FIGS. 1-4. According to the alternative embodiment 40 the hose 12 comprises the female portion of the coupling which is received by a male section 42. Male section 42 includes a male protrusion 43 which is received within the hollow interior 34 of hose 12 as shown in FIG. 5. The male protrusion 43 includes a slightly beveled leading edge 41 to facilitate assembly. An interior O-ring 44 is seated in interior groove 18. In the assembled state the interior O-ring 44 is compressed between grooves 18 and male projection 43 so as to form a liquid or gas impervious seal between the hose 12 and the male coupling 42.

A wire retainer clip 30 similar to that described with respect to the preferred embodiment 10 illustrated in FIGS. 1 through 4 is received in a pair of parallel slots 44 located on opposite sides of the sidewall of the male portion 42. The retainer clip 30 functions to keep the split lock ring 24 from backing out of the cavity 46 in the male member 42. The structure and function of the split lock ring 24 and the retaining clip 30 as employed in the alternative embodiment 40 of FIG. 5 are substantially identical in structure and function to the split lock ring 24 and the retainer clip 30 described with respect to the preferred embodiment 10 illustrated in FIGS. 1 through 4.

The alternative embodiment 40 illustrated in FIG. 5 is assembled in the following manner. Firstly, the interior O-ring 44 is seated within an interior groove 18 of the hose 12. Secondly, split lock ring 24 is placed in position in an exterior groove 14 in the same manner that it is placed in position on the preferred embodiment 10 illustrated in FIGS. 1 through 4. Thirdly, retaining clip 30 is placed in slots 45 so that it protrudes from both sides into interior cavity 46. Fourthly, and lastly, the hose 12 is inserted into cavity 46 until the split lock ring 24 passes beyond the plane of the legs of retainer clip 30. When that happens, the retainer clip 30 snaps into position behind the split lock ring 24 thereby preventing the hose 12 from backing out of cavity 46. During that process the interior O-ring 44 is compressed between groove 18 and male protrusion 43 thereby forming a gas and/or liquid impervious seal between the hose 12 and the male coupling 42.

The embodiments described in FIGS. 1-5 have several major advantages over prior art couplings. Those advantages include, but are not limited to, the following:

1. It is not necessary to manufacture a special male fitting to adapt the end of a corrugated tube or hose to a female section. The male portion of the fitting according to the preferred embodiment, is the end of the corrugated tube itself as modified by the O-ring seal and the split lock ring.

2. The alternative approach in the prior art might have been to machine a groove into a metal tube in order to provide an anchoring location. However, machining of metal to achieve such a result can be relatively expensive and time consuming and, such an approach is not believed to be feasible with respect to lightweight modern plastics.

3. The structure of the present invention is quite inexpensive. Corrugated tubing is less expensive than solid plastic tubing having the same strength characteristics. In addition, corrugation of the tubing naturally allows the hose to bend without kinking.

4. There is a substantial weight saving obtained by employing a corrugated hose. Such weight savings could be of interest to the transportation industry where weight is a factor in such items as airplanes and automobiles.

5. The invention could be used to replace existing parts in the transportation industry. For example the invention could be used to replace the hydraulic fluid lines to power steering units. Alternatively, it could be employed as the gas line to a gasoline tank. It could be also employed as a carburetor by-pass. Accordingly, the invention can be used to transport liquid and gases from place to place and under a variety of positive and negative pressure and temperature conditions.

6. Prior art metal tubing sometimes suffered from the disadvantage that it would crystalize and form cracks and pin hole leaks. Under such circumstances prior art metal tubings were not useful for positive pressure conduits of gas or flammable liquids.

7. No special assembly tools are required to produce the fitting obtained by employing the present invention. With prior art devices at least a wrench was required. The use of a wrench then necessitated sufficient "wrench room" in order to tighten the fitting. Frequently very little "wrench room" is available.

8. The ultimate coupling is formed as a "snap fit" by merely inserting the male connector into the female connector until the retaining clip 30 snaps into locking position behind split lock nut 24. Therefore an absolute minimum of motion and effort is required to produce a secure and tight coupling.

9. Quality control checks are dependably made by merely yanking on the fitting. If the fitting does not separate then the quality control inspector knows with a great deal of certainty that the fitting is good. Therefore a simple "go/no go" inspection suffices.

10. Given the fact that no special tools are required to "snap fit" the coupling together it therefore follows that it is impossible to "over tongue" the fitting since no wrench is required. The prior art screw-in type fittings always suffered from the disadvantage that the coupling could be "over torqued" thereby ruining the threads of the coupling members and destroying the security of the assembly.

11. The fact that the hose material is corrugated allows for some pressure flexibility. Accordingly, there may be some desirable expansion both laterally and across the diameter of the hose under pressurized conditions thereby helping to absorb some of the hydraulic shock frequently associated with rigid prior art lines.

12. One of the major advantages of the invention is that the hose can be of any random length. Therefore, it is not necessary that the hose materials be of a specific precut size as would be required by an old fashioned metallic hydraulic line.

There are changes that can be made to the invention described that still fall within the scope of the general inventive idea. For example, the hose 12 has been described as comprising a corrugated plastic material. However, the hose could be formed of other corrugated materials such as aluminum or other metallic or synthetic substances which perform in the manner described. Similarly, female fitting 26 and male fitting 42 are disclosed as comprising a suitable metal such as machined aluminum. However, it is clearly within the scope of the general inventive concept to employ other materials such as plastics (e.g. Nylon ®) brass, etc. for the same purpose. Similarly the materials employed for the split lock ring 24, O-ring 22 and the retainer clip 30 could be metallic or plastic or the like.

The preferred embodiment of the invention 10 illustrates a coupling in which the female section is employed to connect to yet another coupling through male member 36. It will be appreciated, however, that the basic teaching of the invention would allow the hose 12 to be connected to almost any other item, such as tank 38, provided that the other item is equipped with the appropriate female structure such as that described with regard to coupling 26. Alternatively, of course, the roles of the male and female connectors may be reversed as disclosed in FIG. 5 and the same coupling can be achieved between a hose 12 and an item other than item 42 which was shown as including a male portion 43.

While the invention has been described with reference to the preferred embodiment thereof, it will be appreciated by those of ordinary skill in the art, especially in view of the foregoing comments, that various modifications can be made to the structure and form of the invention without departing from the spirit and scope thereof.

I claim:

1. A corrugated hose coupling apparatus comprising:
a length of corrugated hose having repetitive circular ridges and grooves alternating along its length;
connector means for mating with said hose, said connector means including at least one slot therein;
groove engaging means for engaging at least one of said grooves of said hose, said groove engaging means comprising a split lock ring;
O-ring means received in at least one of said grooves for sealing the connection between said hose and said connector means;
retaining means attached to said connector means for anchoring said connector means with respect to said groove engaging means, said retaining means comprising a spring clip located on the opposite side of said split lock ring from the end of said hose being coupled with said connector means, said spring clip being received in said slot in said connector means, wherein said retaining means and said groove engaging means keep said connector means from disengaging from said hose.

2. The apparatus of claim 1 wherein said connector means is a female connector and wherein said hose is received in said connector means and said O-ring means and said lock ring are located in grooves on the outside of said hose.

3. The apparatus of claim 1 wherein said connector means is a male connector and a portion thereof is received inside of said hose and said O-ring means is located on the inside of said hose.

4. In a hose coupling apparatus including a hose connector means the improvement comprising:

a length of corrugated hose having repetitive circular ridges and grooves along its length;

connector means for mating with said hose, said connector means including at least one slot therein;

groove engaging means for engaging at least one of said grooves of said hose, said groove engaging means comprising a split lock ring;

O-ring means received in at least one of said grooves for sealing the connection between said hose and said connector means;

retaining means attached to said connector means for anchoring said connector means with respect to said groove engaging means, said retaining means comprising a spring clip located on the opposite side of said split lock ring from the end of said hose being coupled with said connector means, said spring clip being received in said slot in said connector means, wherein said retaining means and said groove engaging means keeps said connector means from disengaging from said hose.

5. The apparatus of claim 4 wherein said connector means is a female connector and wherein said hose is received in said female connector and said O-ring means and said split lock ring are located on the outside of said hose.

6. The apparatus of claim 4 wherein said connector means is a male connector and wherein a portion of said male connector is received inside said hose and said O-ring means is located on the inside of said hose.

* * * * *